(12) United States Patent
Hao

(10) Patent No.: US 9,336,235 B2
(45) Date of Patent: May 10, 2016

(54) LOCATION-BASED RECOMMENDATIONS

(75) Inventor: Jack Jianxiu Hao, Lexington, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 378 days.

(21) Appl. No.: 12/938,480

(22) Filed: Nov. 3, 2010

(65) Prior Publication Data

US 2012/0109944 A1 May 3, 2012

(51) Int. Cl.
*G06F 7/00* (2006.01)
*G06F 17/30* (2006.01)

(52) U.S. Cl.
CPC .... *G06F 17/30241* (2013.01); *G06F 17/30867* (2013.01)

(58) Field of Classification Search
CPC ................................................ G06F 17/30867
USPC ....................................................... 707/721
See application file for complete search history.

(56) References Cited

U.S. PATENT DOCUMENTS

| | | | |
|---|---|---|---|
| 2007/0198495 A1* | 8/2007 | Buron et al. | 707/3 |
| 2008/0033914 A1* | 2/2008 | Cherniack et al. | 707/3 |
| 2009/0282023 A1* | 11/2009 | Bennett | 707/5 |

* cited by examiner

*Primary Examiner* — Ajith Jacob

(57) ABSTRACT

A method includes receiving a request to perform a search; identifying a data structure, of a group of data structures, from which to perform the search, based on a location associated with a user device and a search area within which the user device is located, where the data structure stores information associated with at least one geographic area that is intersected by the search area; retrieving, from the data structure, search results associated with subject matter identified in the request, where the search results are associated with locations within the geographic area; identifying, from the data structure, other user devices that performed searches based on the subject matter; retrieving, from the data structure, other search results based on prior searches, associated with other subject matter, that were performed by the other user devices; and sending, to the user device, the search results or the other search results.

24 Claims, 9 Drawing Sheets

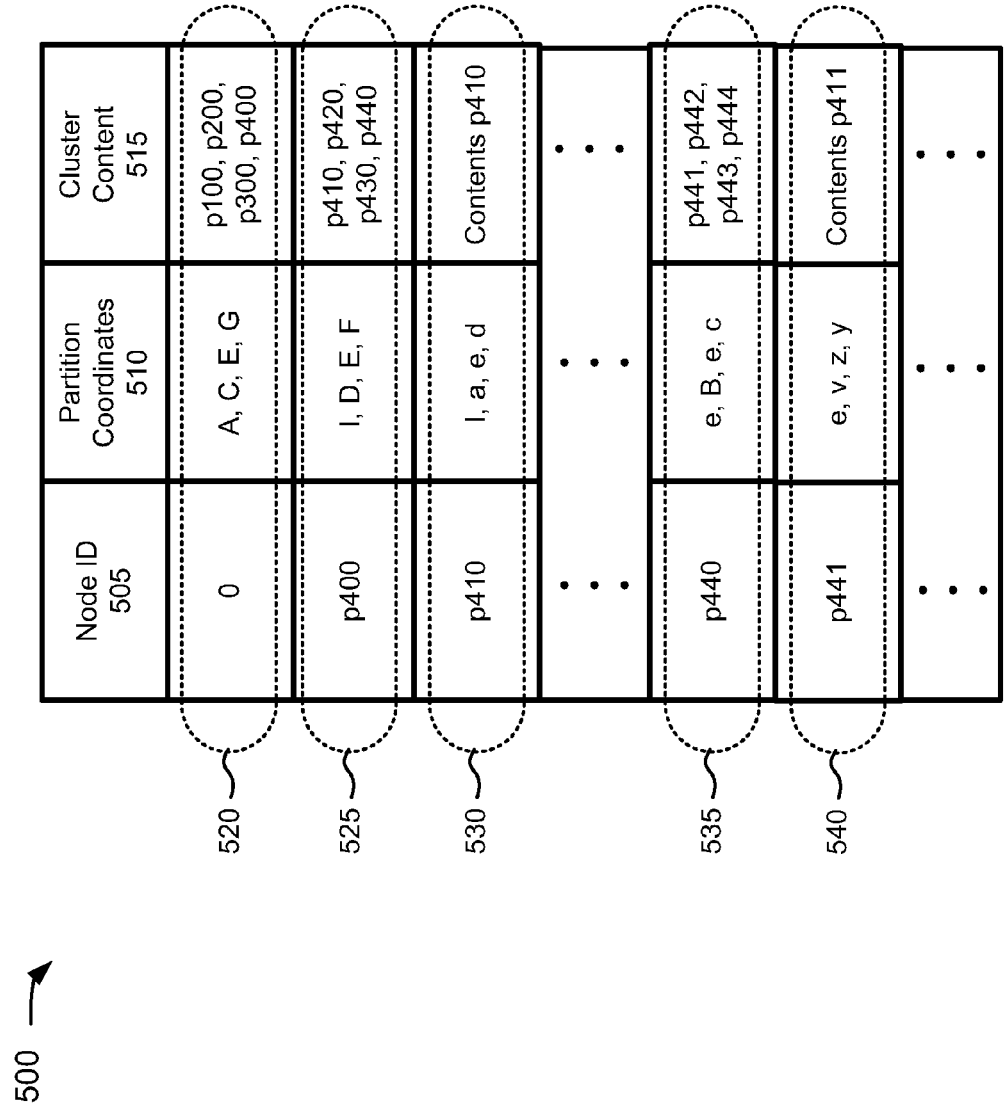

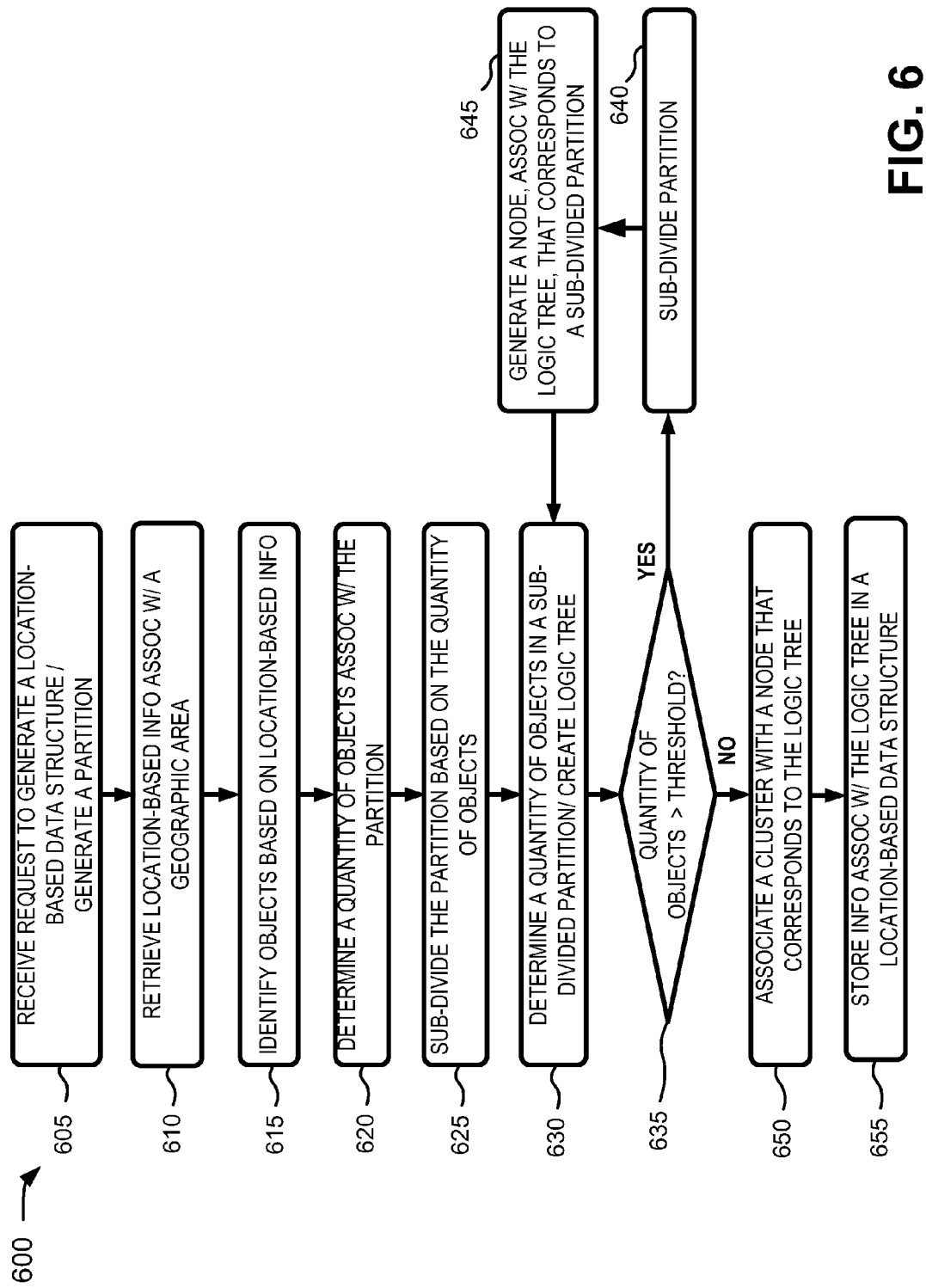

dations according to an implementation described herein.

LOCATION-BASED RECOMMENDATIONS

BACKGROUND INFORMATION

In an increasingly networked world, more and more traffic, such as data, voice, and video, is transmitted over public and proprietary networks. The public and proprietary networks provide a variety of services, such as voice communications, electronic mail, instant messaging, Internet-based services, security, etc.

In the area of search, user devices may submit a search query that identifies the subject matter, key words, phrases, and/or other information in which users of the user devices are interested. The network may respond to the search by providing information to the user devices based on the search query. Unfortunately, the information received by the user device may not be relevant to the user when the network does not take into consideration a location associated with the user device.

BRIEF DESCRIPTION OF THE DRAWINGS

FIG. 5 is a diagram illustrating an example location-based data structure according to an implementation described herein;

FIG. 6 is a flow chart of an example process for generating a location-based data structure according to an implementation described herein;

DETAILED DESCRIPTION OF PREFERRED EMBODIMENTS

The following detailed description refers to the accompanying drawings. The same reference numbers in different drawings identify the same or similar elements. Also, the following detailed description does not limit the invention.

Systems and/or methods, described herein, may include generating location-based recommendations associated with a search performed by a user device. As described herein, a partitioning application may generate a location-based data structure that stores information, which can be searched by a user device based on a location associated with the user device. The partitioning application may, as a result of the search, generate location-based results that correspond to the location associated with the user device. The results may also include recommendations that identify other results that correspond to the location associated with the user device and that are based on a measure of popularity associated with the identified other results.

Figure 1:
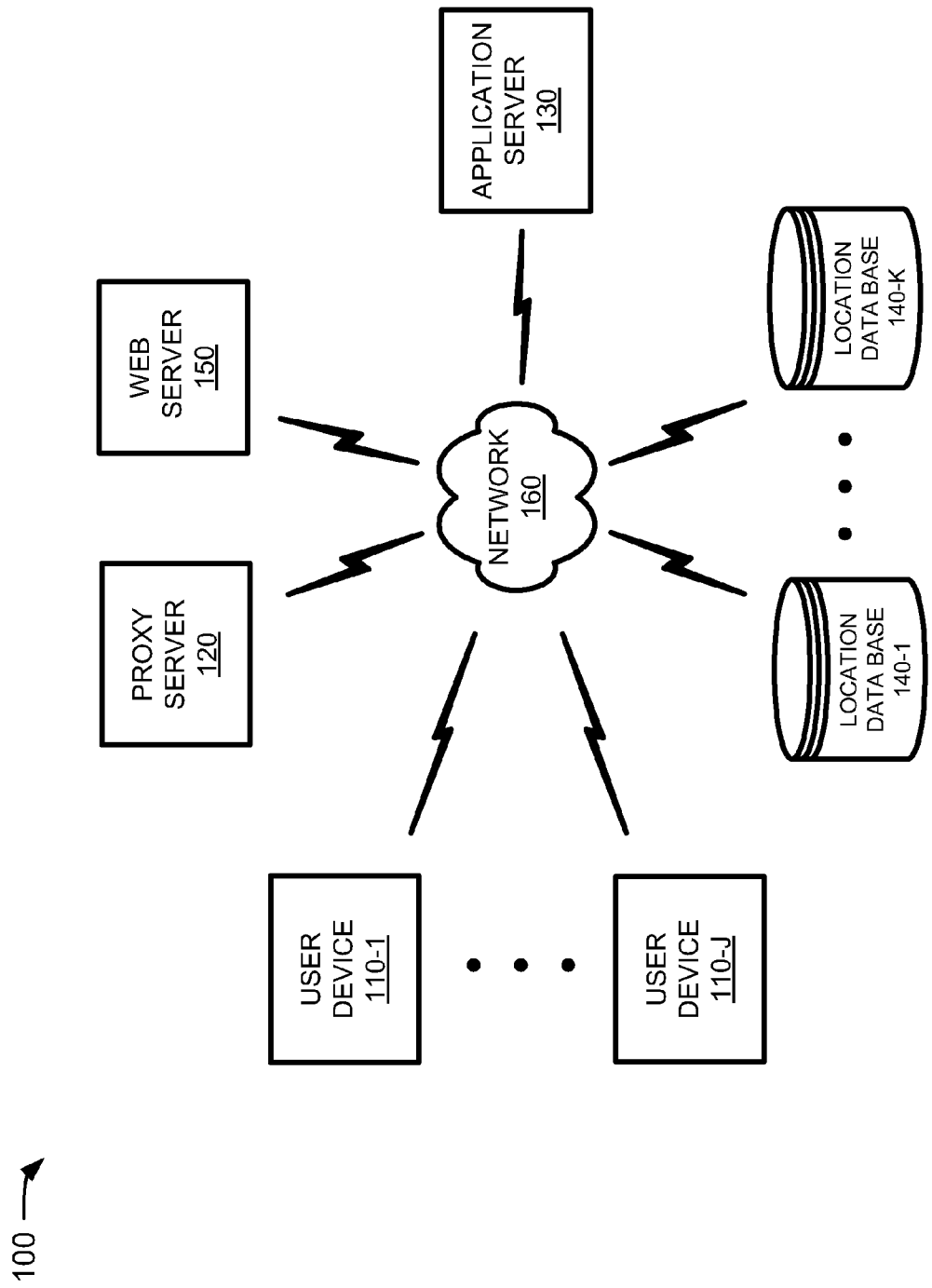
FIG. 1 is a diagram of an example environment in which system and/or methods, described herein, may be implemented.

FIG. 1 is a diagram of an example environment 100 in which system and/or methods, described herein, may be implemented. As illustrated in FIG. 1, environment 100 may include a group of user devices 110-1, . . . , 110-J (where J≥1) (hereinafter referred to collectively as "user devices 110" and individually as a "user device 110"), a proxy server 120, an application server 130, a group of location data bases 140-1, . . . , 140-K (where K≥1) (hereinafter referred to collectively as "data bases 140" and individually as a "database 140"), and a web server 150 that are interconnected by a network 160. In practice, environment 100 may include additional devices and/or networks, fewer devices and/or networks, different devices and/or networks, or differently arranged devices and/or networks than are shown in FIG. 1. Additionally, or alternatively, one or more devices and/or networks of environment 100 may perform the tasks described as being performed by one or more other devices and/or networks of environment 100. For example, proxy server 120, application server 130, and/or data bases 140 may be combined into a single device.

User device 110 may include any computation or communication device, that is capable of communicating with network 160. For example, user device 110 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, a personal computer, a set top box (STB), a television, a camera, a personal gaming system, or another type of computation or communication device. In an example implementation, user device 110 may include a location component that enables location information, associated with user device 110, to be transmitted to network 160 (e.g., automatically, as a result of a query from network 160, etc.). For example, the location component may include a global positioning satellite (GPS) transponder that communicates with a GPS satellite constellation in order to obtain and/or generate location information associated with user device 110.

User device 110 may communicate with network 160 in order to perform a search. In one example, a user of user device 110 may enter a search query (e.g., that includes key words associated with subject matter to be searched) into user device 110 (e.g., via a search engine, a web browser, etc.). The user may cause the query to be sent to network 160 in order to obtain information associated with the subject matter of the search query. User device 110 may, in one example, send the search query in a manner that includes location information associated with user device 110. In another example, user device 110 may send the location information independently from the search query and/or at a different point in time. In another example, user device 110 may not send location information to network 160.

Proxy Server 120 may include one or more server devices, or other types of computation or communication devices, that gather, process, search, store, and/or provide information. Proxy server 120 may communicate with user device 110 on behalf of application server 130 and/or network 160. For example, proxy server 120 may authenticate user device 110 and may determine to which application server 130 a search query, from user device 110, is to be communicated. Proxy server 120 may receive location information from user device 110 (and/or may query user device 110 to obtain the location information), which proxy server 120 may send to application server 130. Proxy server 120 may send the location information when sending a search query, received from user device 110, to application server 130 and/or at another point in time. In another example, proxy server 120 may generate the location information associated with user device 110. For example, proxy server 120 may use a triangulation method and/or some other method, to generate the location information based on information associated with cells and/or base stations with which user device 110 is communicating.

Application server 130 may include one or more server devices, or other types of computation or communication devices, that gather, process, search, store, and/or provide information. Application server 130 may communicate via network 160 and may process search queries received from user device 110. In one example implementation, application server 130 may store software or logic associated with a partitioning application. Application server 130 may use the partitioning application to generate one or more location-based data structures that can be used to perform a location-based search. Application server 130 may use the partitioning application to perform the search based on a search query received from user device 110, to generate location-based search results and/or to generate location-based recommendations based on the search results.

Application server 130 may communicate with web server 150 to obtain information to be stored in a location-based data structure. The information may be received from web-server 140 and the partitioning application may process the information based on subject matter, location, and/or other factors. In an example implementation, the partitioning application may process the information in order to create one or more information layers, where each of the layers includes information associated with different subjects. The information layers may be related in terms of location. For example, an information layer may include particular subject matter (e.g., information associated with restaurants) that is not related to subject matter in another layer (e.g., information associated with public schools). However, the particular subject matter associated with the information layer and the subject matter in the other information layer may by interrelated based on information associated with location (e.g., latitude and/or longitude) relative a geographic area (e.g., the surface of the earth, a continent, a country, a state, a zip code, partitions within a zip code, etc.).

Application server 130 may associate information within each information layer with partitions within a geographical area. The partitioning application may sub-divide a geographical area into one or more partitions. The partitions may vary in area based on a quantity of information that is associated with each of the partitions. The partitioning application may, for example, size a partition to ensure that a quantity of information associated with the partition is below a threshold. Ensuring that the quantity of information is below a threshold enables each partition to be searched within a manageable period of time (e.g., below a time threshold). The partitioning application may store information associated with the partitioned information layers in one or more location-based data structures. The application server 130 may store the one or more location-based data structures in data bases 140.

The application server 130 may perform searches of the location-based data structure in response to search queries received from user device 110. The partitioning application may search the location-based data structure based on subject matter of a search query and/or location information associated with user device 110 from which the search query was received. The partitioning application may generate results of the search that identifies information associated with the search query that may correspond to one or more locations within a particular distance (e.g., below a threshold) of user device 110. The partitioning application may identify other search queries (e.g., performed for other user devices 110), that correspond to the subject matter associated with the search query, to identify a popularity associated with the results of the search query. The partitioning application may determine that the other user devices 110 also performed searches associated with other subject matter and may provide location-based recommendations to user device 110 based on the other subject matter.

Database 140 may include one or more devices that receive, store, and/or retrieve information. Database 140 may communicate with network 160 and/or application server 130. In an example implementation, database 140 may store location-based information and/or a location-based data structure. Database 140 may receive a write request, associated with location-based information, from application server 130 and may store the location-based information, associated with the write request. Database 140 may receive a read request, associated with location-based information, from application server 130 and may retrieve the location-based information, associated with the read request. In one example, database 140 may store location-based information and/or location-based data structure associated with all partitions for a particular geographical area. In another example, database 140 may store location-based information, associated with a portion of the partitions for the particular geographic area and another database 140 may store location-based information associated with another portion of the partitions for the particular geographic area.

Web server 150 may include one or more server devices, or other types of computation or communication devices, that gather, process, search, store, and/or provide information. Web server 150 may communicate via network 160 may process search queries received from user device 110 and/or application server 130. In one example implementation, web server 150 may be associated with a website and/or public database (e.g., associated with a government agency, a private firm, etc.) that stores publically available information (e.g., geographic data, geographic mapping information, geographic information systems data, economic data, telephone listings, address information, public records, etc.).

In another example implementation, web server 150 may host a website that enables application server 130 and/or user device 110 to access information associated with particular subject matter, such as geographical information (e.g., topology, roads, cities, towns, airports, etc.), business establishment information (e.g., restaurants, hotels, cinemas, shopping centers, etc.), public establishment information (e.g., schools, fire departments, military bases, police stations, national parks, etc.), contextual information (e.g., point of sale information, user review information, popularity information, etc.), and/or other information (e.g., products, movies, services, etc.). For example, web server 150 may receive a request, from application server 130, for information associated with particular subject matter and web server 150 may send the information to the application server 130 (e.g., to be stored within an information layer associated with a location-based data structure) in response to the request.

Network 160 may include one or more wired and/or wireless networks. For example, network 160 may include a cellular network, a public land mobile network (PLMN), a second generation (2G) network, a third generation (3G) network, a fourth generation (4G) network (e.g., a long term evolution (LTE) network), a fifth generation (5G) network, and/or another network. Additionally, or alternatively, network 160 may include a wide area network (WAN), a metropolitan network (MAN), a telephone network (e.g., the Public Switched Telephone Network (PSTN)), an ad hoc network, an intranet, the Internet, a fiber optic-based network (e.g., a FiOS network), and/or a combination of these or other types of networks.

Figure 2:
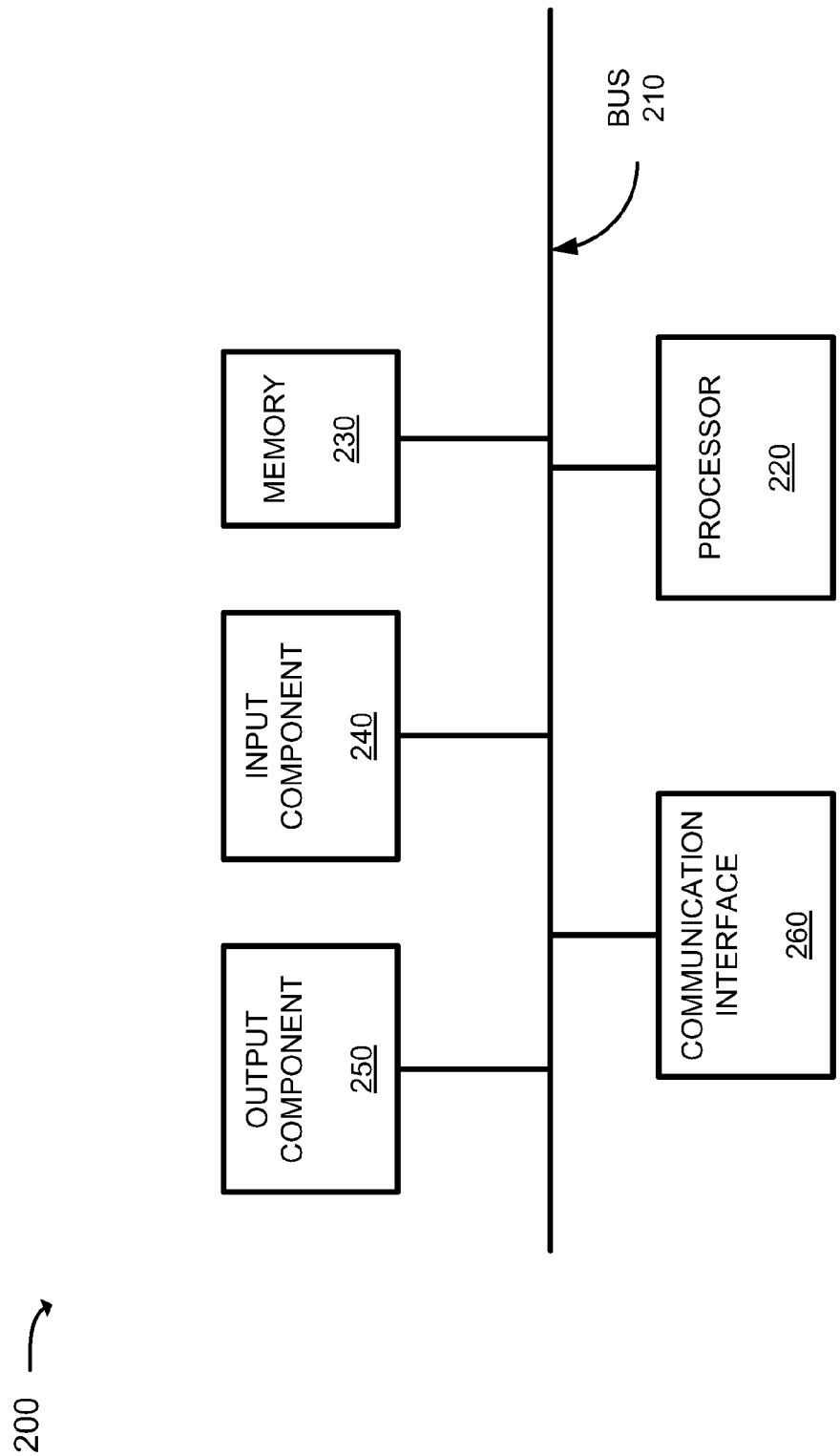
FIG. 2 is a diagram illustrating example components of one or more devices as illustrated in FIG. 1.

FIG. 2 is a diagram illustrating example components of device 200 that may correspond to user device 110, proxy server 120, application server 130, and/or web server 150. Each of user device 110, proxy server 120, application server 130, and/or web server 150 may include one or more devices 200. As shown in FIG. 2, device 200 may include a bus 210, a processor 220, a memory 230, an input component 240, an output component 250, and a communication interface 260.

Although FIG. 2 shows example components of device 200, in other implementations, device 200 may contain fewer components, different components, additional components, or differently arranged components than depicted in FIG. 2. Additionally, or alternatively, one or more components of device 200 may perform one or more tasks described as being performed by one or more other components of device 200.

Bus 210 may include a path that permits communication among the components of device 200. Processor 220 may include one or more processors, microprocessors, or processing logic (e.g., application specific integrated circuits (ASICs) or field programmable gate arrays (FPGAs)) that may interpret and execute instructions. Memory 230 may include a random access memory (RAM) device or another type of dynamic storage device that may store information and instructions for execution by processor 220, a read only memory (ROM) device or another type of static storage device that may store static information and instructions for use by processor 220, a magnetic and/or optical recording memory device and its corresponding drive, and/or a removable form of memory, such as a flash memory.

Input component 240 may include a mechanism that permits an operator to input information to device 200, such as a keypad, a button, a pen, a touch screen, voice recognition and/or biometric mechanisms, etc. Output component 250 may include a mechanism that outputs information to the operator, including a display, one or more light emitting diodes (LEDs), a speaker, etc.

Communication interface 260 may include any transceiver-like mechanism that enables device 200 to communicate with other devices and/or networks, such as for communicating with network 160. For example, communication interface 260 may include a modem, a network interface card, or a wireless interface card.

As will be described in detail below, device 200 may perform certain operations. Device 200 may perform these operations in response to processor 220 executing software instructions contained in a computer-readable medium, such as memory 230. A computer-readable medium may be defined as one or more logical or physical memory devices. A logical memory device may include space within a single physical memory device or spread across multiple physical memory devices.

The software instructions may be read into memory 230 from another computer-readable medium, or from another device via communication interface 260. The software instructions contained in memory 230 may cause processor 220 to perform processes that will be described later. Alternatively, hardwired circuitry may be used in place of or in combination with software instructions to implement processes described herein. Thus, implementations described herein are not limited to any specific combination of hardware circuitry and software.

Figure 3:
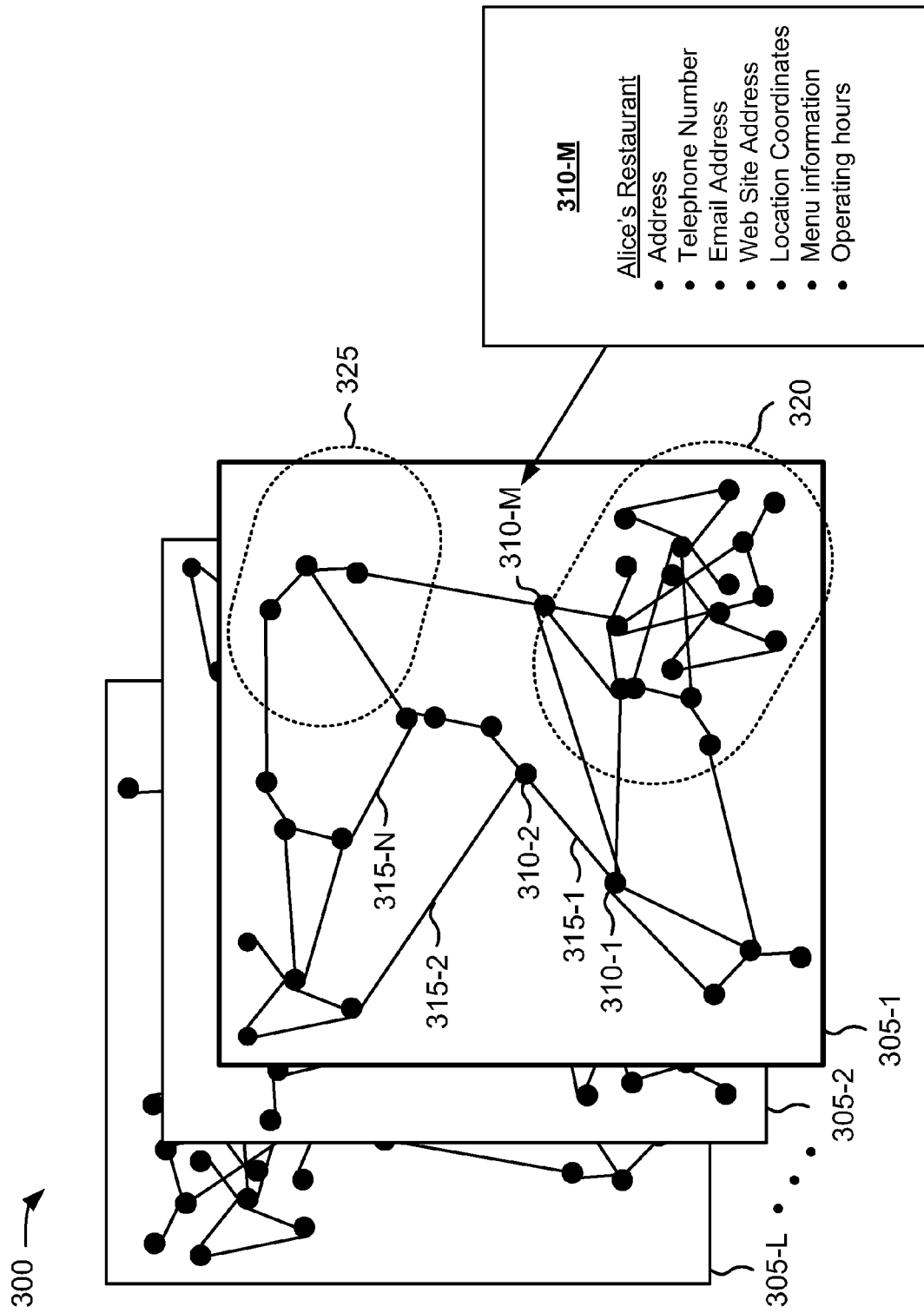
FIG. 3 is a diagram illustrating example location-based information according to an implementation described herein.

FIG. 3 is a diagram illustrating example location-based information 300 (hereinafter referred to as "location information 300") according to an implementation described herein. As illustrated, location information 300 may include a group of information layers 305-1, . . . , 305-L (where L≥1) (hereinafter referred to collectively as "information layers 305" and individually as an "information layer 305"). Information layers 305 may include information associated with a particular geographic area.

For example, information layer 305-1 may be associated with information that corresponds to particular subject matter (e.g., topology information associated with the geographic area). Information layer 305-2 may be associated with information that is different than the particular subject matter (e.g., information associated with hotels, etc.). Each information layer 305 may be associated with a broad array of location-based information obtained (e.g., via web server 150 and/or user devices 110) from public and/or private sources (e.g., websites, public data bases, private data bases, etc.) and may include a broad array of subject matter, such as geographical information (e.g., topology, roads, cities, towns, airports, etc.), business establishment information (e.g., restaurants, hotels, cinemas, shopping centers, etc.), public establishment information (e.g., schools, fire departments, military bases, police stations, national parks, etc.), entertainment and/or recreation information (e.g., movie listings, sporting events, festivals, etc.), context information associated with user devices 110 (e.g., point of sale transactions to purchase goods and/or services, user habits, user reviews associated with products and/or services, a quantity of searches, subject matter of searches, etc.), and/or other information (e.g., political information, news, products and services, etc.).

Information layer 305 may include one or more objects that represent information relating to the particular subject matter. For example, information layer 305-1 may be associated with information regarding a transportation system. Objects in information layer 305-1 may represent transportation elements, such as airports, stop lights, etc. The objects may be either points 310 and/or links 315. Points 310 may be associated with certain elements and/or units within the information. For example, points 310 (e.g., points 310-1, . . . , 315-M, where M≥1) may be associated with elements and/or units within the transportation system (e.g., intersections, rail stations, airports, stop lights, highway exits and/or interchanges, bridges, etc.). Links 315 may be associated with interconnections between the elements and/or units within the information. For example, links 315 (e.g., links 315-1, . . . , 315-N, where N≥1) may be associated with interconnections between points 310 within the transportation system (e.g., that correspond to city streets, rural routes, expressways, railways, bike paths, etc.). Thus, information layer 305 may include points 310, links 315, and/or some combination of points 310 and/or links 315.

Each point 310 and/or link 315 may be associated with information associated with an information unit/element and/or interconnection, respectively, within the information that corresponds to the particular subject matter. For example, if information layer 305-1 is associated with information corresponding to restaurants within a particular geographical region, then each restaurant may correspond to a respective point 310. In one example, point 310-M may correspond to a particular restaurant (e.g., shown as Alice's Restaurant in FIG. 3). Point 310-M may, for example, be associated with information associated with the particular restaurant (e.g., restaurant name, an address, a telephone number, an email address, a web site address, location coordinates, menu information, operating hours, etc.). Another information layer 305 (e.g., information layer 305-L) may be associated with reviews, ratings, popularity information, a quantity of searches etc. associated with subject matter associated with the particular geographic area. The other information layer 305 may include another point 310 that corresponds to a location associated with point 310-M. The other point 310 may be associated with reviews, ratings, measures of popularity, newspaper write-ups, etc. associated with Alice's Restaurant. Yet another information layer 305 (e.g., information layer 305-3) may include a point 310 that is associated with directions by which Alice's Restaurant can be patronized by a user of user device 110.

Figures 4A, 4B:
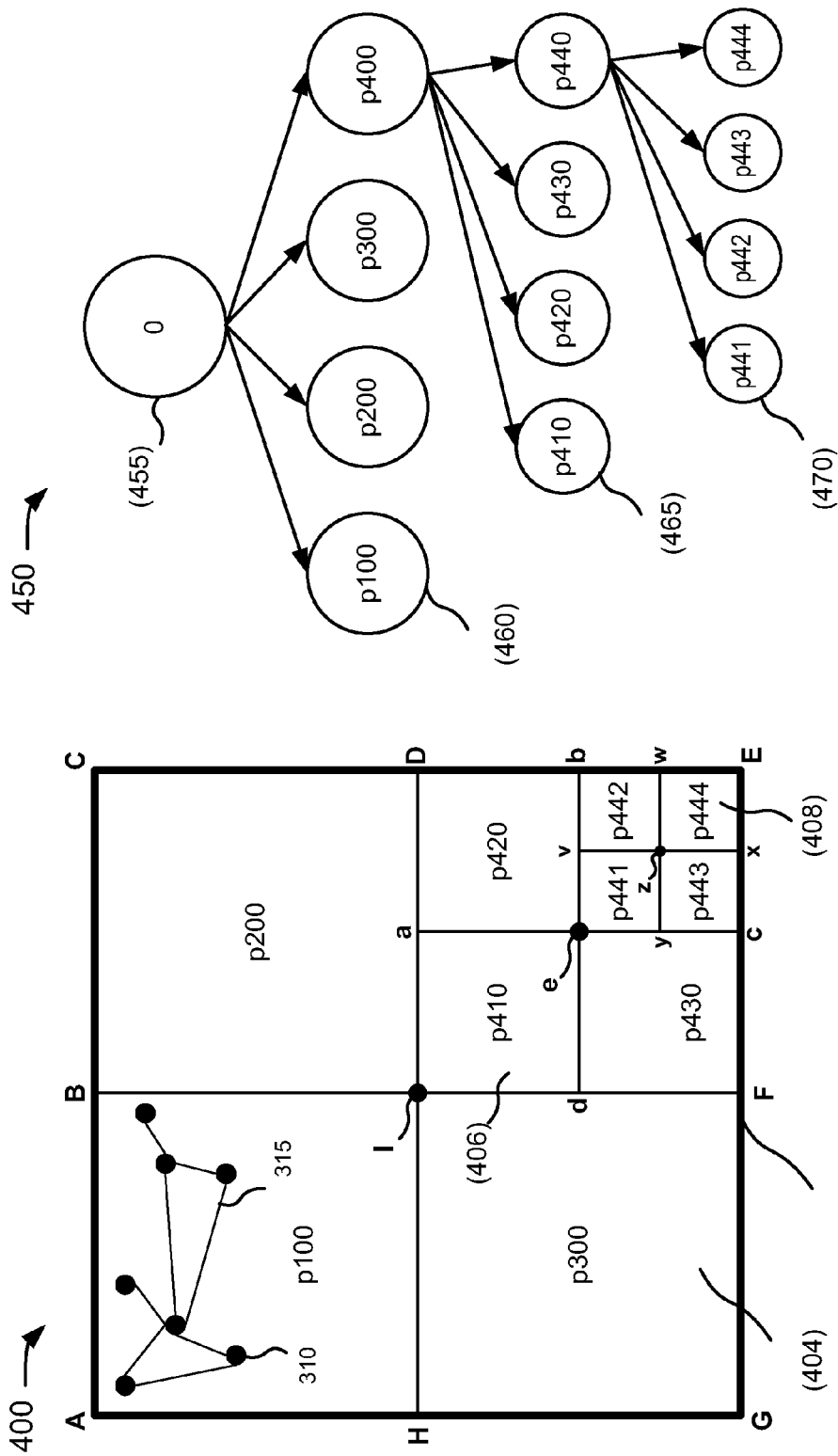
FIG. 4A is a diagram illustrating an example location-based partition structure according to an implementation described herein.
FIG. 4B is a diagram illustrating an example location-based logic tree structure according to an implementation described herein.

FIG. 4A is a diagram illustrating an example location-based partition structure 400 (hereinafter referred to as "partition structure 400") according to an implementation described herein. For example, partition structure 400 may include partitions 402-408. Partition 402 may be a logical partition of partition structure 400. For example, the boundaries of partition 402 (e.g., defined by the coordinates associated with ACEG) may correspond to coordinates (e.g., latitude and/or longitude) associated with a geographical region. Partition 402 may be associated with information (e.g., associated with objects, such as points 310 and/or links 315, included in information layers associated with the geographic area) that corresponds to locations within partition 402.

Partition 404 may be a logical partition associated with another portion of the geographic region. For example, the boundaries of partition 404 (e.g., associated with partition identifier "p300" and/or defined by the coordinates associated with HIFG) may correspond to coordinates associated with the portion of the geographical region. More than one partition 404 may be included within partition 402 (e.g., partitions 404 associated with partition identifiers p100, p200, p300, and p400 (not shown)). Partition 404 may be associated with information that corresponds to locations within partition 410.

Partition 406 may be a logical partition associated with yet another portion of the geographic region. For example, the boundaries of partition 406 (e.g., associated with partition identifier "p410" and/or defined by the coordinates associated with Iaed) may correspond to coordinates associated with the portion of the geographical region within partition 404. More than one partition 406 may be included within the boundaries associated with partition 404 (e.g., partitions 406 associated with partition identifiers p410, p420, p430, and p440 (not shown)). Partition 406 may be associated with information that corresponds to locations within partition 406. Partition 408 may be a logical partition associated with still another portion of the geographic region. For example, the boundaries of partition 408 (e.g., associated with partition identifier "p444" and/or defined by the coordinates associated with zwEx) may correspond to coordinates associated with the portion of the geographical region within partition 406. More than one partition 408 may be included within partition 406 (e.g., partitions 408 associated with partition identifiers p441, p442, p443, and p444). Partition 408 may be associated with information that corresponds to locations within partition 408.

For example, the partitioning application may determine that partition 402 is associated with a quantity of objects that is greater than a threshold and may sub-divide partition 402 into smaller partitions (e.g., sometimes referred to as child partitions). For example, the partitioning application may sub-divide partition 402 into partitions 404. In one example, the partitioning application may associate each partition 404 with an identifier (e.g., p100 associated with boundaries ABIH; p200 associated with boundaries BCDI, p300 associated with boundaries HIFG, and p400 (not shown) associated with boundaries IDEF). Partition 402 may be referred to as a parent partition relative to partitions 404.

In another example, the partitioning application may determine that a particular partition 404 is associated with another quantity of objects that is greater than the threshold and may sub-divide the particular partition 404 (e.g., associated with partition identifier p400) into child partitions. For example, the partitioning application may sub-divide partition 404 into a quantity of partitions 406. In one example, the partitioning application may associate each partition 406 with an identifier (e.g., p410 associated with boundaries Iaed; p420 associated with boundaries aDbe, p430 associated with boundaries decF, and p440 (not shown) associated with boundaries ebEc).

The partitioning application may continue to sub-divide partitions into child partitions (e.g., partitions 408 corresponding to partition identifier p441 associated with boundaries evzy, p442 associated with boundaries vbwz, p443 associated with boundaries yzxc, and p444 associated with boundaries zwEx) until each resulting partition is associated with a quantity of objects that is less than the threshold. In another example, the partitioning application may determine that a child partition is associated with a quantity of objects that is greater than the threshold. In this example, the partitioning application may not sub-divide the child partition when the partitioning application determines that the boundaries and/or area, associated with the child partition, are less than a minimum dimension and/or area, respectively.

Objects included within a partition that is not associated with a child partition may correspond to a quantity of location-based information identified as a cluster. The cluster may include a manageable quantity of information (e.g., 10 objects, 100, objects, 1,000 objects, 10,000 objects, etc.) that can be indexed and/or searched, by the partitioning application, within a period of time that is less than a threshold.

Although FIG. 4A shows example partitions of partition structure 400, in other implementations, partition structure 400 may include fewer partitions, different partitions, additional partitions, or differently arranged partitions than depicted in FIG. 4A. For example, in other implementations, partitions may include a different quantity of sides (e.g., three sides, five sides, six sides, etc.) than are shown in FIG. 4A. In another example, partitions may include a different shape (e.g., a circle, an ellipse, a rectangle, a diamond, a trapezoid, etc.) than are shown in FIG. 4A. In yet another example, a partition may be subdivided into a different quantity of partitions (e.g., 2 partitions, 3, partitions, 5, partitions, etc.) than are shown in FIG. 4A. Additionally, or alternatively, one or more partitions, of partition structure 400, may include information described as being included in one or more other partitions of partition structure 400.

FIG. 4B is a diagram illustrating an example location-based logic tree structure 450 (hereinafter referred to as "logic tree 450") according to an implementation described herein. Logic tree 450 may correspond to logical interconnections between partitions within partition structure 400 of FIG. 4A. More particularly, logic tree 450 may correspond to the logical interconnection between partitions that enable clusters associated with lowest level partitions (e.g., partitions not associated with a child partition) to be identified and/or searched based on location information associated with user device 110. Logic tree 450 may include a parent node 455, a group of child nodes 460, a group of grandchild nodes 465, and a group of great grandchild nodes 470.

Parent node 455 may correspond to partition 402 of FIG. 4A. For example, parent node 455 may be associated with a logical starting point of a location-based search for one or more information clusters that corresponds to a largest geographic area (e.g., associated with partition 405) associated with information layers stored in a location-based data structure (e.g., described in detail in FIG. 5). Parent node 455 may be associated with the group of child nodes 460.

Child nodes 460 may correspond to partitions 404 of FIG. 4A. For example, if the partitioning application sub-divides partition 402 into a quantity of child partitions (e.g., partitions 404), then the partitioning application may generate a quantity of child nodes 460 that corresponds to the quantity of child partitions (e.g., associated with identifiers p100-p400 as shown in FIG. 4B). One or more child nodes 460 may be associated with the group of grandchild nodes 465.

Grandchild nodes 465 may correspond to partitions 406 of FIG. 4A. For example, if the partitioning application sub-divides partition 404 into a quantity of other child partitions (e.g., partitions 406), then the partitioning application may generate a quantity of grandchild nodes 465 that corresponds to the quantity of other child partitions (e.g., associated with identifiers p410, p420, p430, and/or p440 as shown in FIG. 4B). One or more grandchild nodes 465 may be associated with the group of great grandchild nodes 470 that correspond to partitions 408 of FIG. 4A (e.g., associated with identifiers p441-p444 as shown in FIG. 4B) in a manner similar to that described above. Alternatively, or additionally, the partitioning application may generate lower level nodes that correspond to lower level partitions (e.g., partitions that are further sub-divided relative to partition 408).

The partitioning application may associate clusters to nodes within logic tree 450. For example, the partitioning application may associate an identifier associated with nodes, within logic tree 450, to clusters associated with partitions within FIG. 4A to which the nodes correspond. In one example, a node identifier (e.g., p441) associated with great grandchild node 470 may be logically associated with and/or assigned to a cluster associated with a particular partition 408 (e.g., with boundaries zwEx, as shown in FIG. 4A), by the partitioning application.

Although FIG. 4B shows example nodes of logic tree 450, in other implementations, logic tree 450 may include fewer nodes, different nodes, additional nodes, or differently arranged nodes than depicted in FIG. 4B. For example, additional layers of nodes may be included, such as great, great grandchild nodes, etc. Additionally, or alternatively, one or more nodes, of logic tree 450, may include information described as being included in one or more other nodes of logic tree 450.

FIG. 5 is a diagram illustrating an example location-based data structure 500 (hereinafter referred to as "data structure 500") according to an implementation described herein. As illustrated in FIG. 5, data structure 500 may include a collection of fields such as a node identifier (ID) field 505, a partition coordinates field 510, and a cluster contents field 515. Although FIG. 5 shows example fields of data structure 500, in other implementations, data structure 500 may include fewer fields, different fields, additional fields, or differently arranged fields than depicted in FIG. 5. Additionally, or alternatively, one or more fields of data structure 500 may include information described as being included in one or more other fields of data structure 500.

Node ID field 505 may store information associated with a particular node associated with a location-based logic tree. Partition coordinates field 510 may store information associated with coordinates, area, and/or boundaries associated with a partition that correspond to the particular node. Cluster contents field 515 may store location-based information and/or information associated with child nodes associated with the particular node. For example, the partitioning application may store location-based information associated with objects that are located within the area and/or boundaries associated with the partition to which the particular node corresponds. The partitioning application may store the location-based information when the partition is not associated with a child node. In another example, the partitioning application may store information associated with a child node when the partition to which the particular node corresponds is associated with a child node.

For example, in a manner similar to that described above in FIGS. 4A and 4B, the partitioning application may generate a logic tree structure (e.g., logic tree 450 of FIG. 4B) based on a partition structure (e.g., partition structure 400 of FIG. 4A) associated with a geographical area. In one example, the partitioning application may store information associated with a particular parent node (e.g., parent node 455 associated with an identifier, such as "0" as shown by ellipse 520) that corresponds to a partition associated a geographical area (e.g., partition 402). The partitioning application may store partition coordinates (e.g., A, C, E, G) associated with the partition to which the parent node corresponds and/or information associated with child nodes (e.g., child nodes 460 associated with identifiers p100,p 200, p300, p400) that are logically connected to the particular parent node (e.g., as shown by ellipse 520).

In another example, the partitioning application may store information associated with a child node (e.g., child node 460 associated with an identifier, such as "p400" as shown by ellipse 525) that is logically connected to the parent node. The child node may correspond to a partition that is a child partition (e.g., partition p400) of the partition associated a geographical area. The partitioning application may store coordinates (e.g., IDEF) associated with the child partition and/or information associated with grandchild nodes (e.g., grandchild nodes 465 associated with identifiers p410, p420, p430, p440) that are logically connected to the child node (e.g., as shown by ellipse 525).

In yet another example, the partitioning application may store information associated with a grandchild node (e.g., grandchild node 465 associated with an identifier, such as "p410" as shown by ellipse 530) that is logically connected to the child node. The grandchild node may correspond to a partition that is another child partition (e.g., partition p410) of the child partition (e.g., partition p400). The partitioning application may store coordinates (e.g., Iaed) associated with the other child partition and/or location-based information (e.g., shown as contents p410) associated with a cluster that corresponds to the grandchild node (e.g., shown as ellipse 530). The location-based information may be associated with objects located within the boundaries of the other child partition.

In another example, the partitioning application may store information associated with another grandchild node 465 (e.g., associated with identifier p440) that is associated with one or more lower level nodes, such as great grandchild nodes (e.g., great grandchild nodes 470 associated with identifiers, such as p441, p442, p443, p444) (e.g., as shown as ellipse 535). In still another example, the partitioning application may store information associated with a great grandchild node (e.g., associated with an identifier p441) that is not associated with lower level nodes and may store location-based information (e.g., shown as contents p411) associated with a cluster that corresponds to the great grandchild node (e.g., shown as ellipse 540). The partitioning application may store information associated with each node within the location-based logic tree, which may permit the partitioning application perform location-based searches of the information stored in location-based data structure 500.

The partitioning application may store data structure 500 in one or more location data bases 140. For example, the partitioning application may store data structure 500 associated with all of the nodes of a logic tree (e.g., logic tree 450 of FIG. 4B) in location database 140. In another example, the partitioning application may store one or more data structures 500, associated with a portion of the nodes, in one or more location data bases 140 and may store another one or more data structures 500, associated with another portion of the nodes, in another one or more location data bases 140. In this example, location-based information associated with a portion of the nodes (e.g., that corresponds to one or more partitions associated with a particular geographical area) may be stored in a particular location data based 140 (e.g., that is associated with the particular geographic area).

FIG. 6 is a flow chart of an example process 600 for generating a location-based data structure according to an implementation described herein. In one implementation, process 600 may be performed by application server 130. In other implementations, some or all of process 600 may be performed by another device or a group of devices separate from or including application server 130.

As shown in FIG. 6, process 600 may include receiving a request to generate a location-based data structure and generating a partition (block 605). For example, application server 130 may receive a request from a network administrator, associated with network 160, to generate a location-based data structure (e.g., data structure 500 of FIG. 5) associated with a geographic area. The partitioning application may, in response to the request, create a parent partition (e.g., partition 402 of FIG. 4A) with coordinates and/or boundaries that correspond to the geographic area identified in the request. For example, the parent partition may encompass the surface of the earth and/or a portion of the surface of the earth, such as one or more continents, countries, states, zip codes and/or other areas based on the geographic area.

As also shown in FIG. 6, process 600 may include retrieving location-based information associated with a geographic area (block 610) and identifying objects based on the location-based information (block 615). For example, the partitioning application may, in a manner similar to that described above (e.g., with respect to FIG. 3) communicate with web server 150 to retrieve location-based information associated with the geographic region to which the parent partition corresponds. The location-based information may be retrieved, via web server 150, from public and/or private sources (e.g., websites, public data bases, private data bases, etc.). The partitioning application may also retrieve location-based context information associated with user devices 110 located within the parent partition. The location-based information may be retrieved at a particular point in time and/or over a period of time.

The partitioning application may, in a manner similar to that described above (e.g., with respect to FIG. 3,) process the retrieved location-based information by associating the location-based information with one or more information layers based on subject matter and/or other information (e.g., time, popularity, etc.). Alternatively, or additionally, the partitioning application may identify objects (e.g., points 310 and/or links 315 of FIG. 3) associated with the location-based information within each information layer. Each object may be associated with a particular location within the parent partition.

In another example implementation, the partitioning application may process the location-based information in a manner that does not include associated with location-based information with one or information layers.

As further shown in FIG. 6, process 600 may include determining a quantity of objects associated with the partition (block 620) and generating child partitions based on the quantity of objects (block 625). For example, the partitioning application may determine a quantity of objects within each information layer and may identify a quantity of objects associated with the parent partition based on the determination of the quantity of objects within each information layer. The partitioning application may compare the identified quantity of objects associated with the parent partition to a threshold to determine whether the parent partition is to be sub-divided into smaller partitions (e.g., child partitions). Based on the determination, the partitioning application may sub-device the parent partition into smaller partitions (e.g., such as child partitions 404 of FIG. 4A). Each of the child partitions may be associated with a portion of the objects associated with the parent partition. The portion of the objects, associated with each of the child partitions, may be based on a location of the objects relative to the respective area of each of the child partitions. The respective area may be based on the coordinates and/or boundaries of each of the child partitions.

It should be appreciated that for a geographic area that is large and/or densely developed or populated (e.g., a city, county, state and/or province, country, etc.), there may be a high likelihood that the parent partition is to be sub-divided in order to reduce the quantity of objects within a sub-divided partition to a threshold that can be searched within a particular period of time (e.g., less than a time threshold).

As is further shown in FIG. 6, process 600 may include determining a quantity of objects associated with sub-divided partition and creating a logic tree (block 630). For example, the partitioning application may identify, in a manner similar to that described above (e.g., with respect to block 620) a quantity of objects associated with each sub-divided partitions (e.g., each child partition). The partitioning application may determine whether any of the sub-divided partitions are to be further sub-divided by comparing a quantity of objects, associated with each sub-divided partition, with the threshold.

The partitioning application may create a location-based logic tree (e.g., logic tree 450 of FIG. 4B) that corresponds to the partitions. For example, the partitioning application may, in a manner similar to that described above (e.g., with respect to FIG. 4B), generate a parent node associated with the parent partition and/or child nodes associated with the child partitions. The child nodes may be logically interconnected to the parent node.

As still further shown in FIG. 6, if the quantity of objects is greater than a threshold (block 635-YES), then process 600 may include sub-dividing a partition (block 640) and generating a node, associated with the logic tree, that corresponds to a sub-divided partition (block 645). For example, the partitioning application may determine that the quantity of objects associated with a partition (e.g., a child partition, etc.) is greater than the threshold. Based on the determination, the partitioning application may sub-divide the partition. For example, if the partition being sub-divided is a child partition, then the sub-divided child partition may result in grandchild partitions. In this example, each of the grandchild partitions may be associated with a portion the objects associated with the child partition. The portion of the objects, associated with each of the grandchild partitions, may be based on a location of the objects relative to the respective area of each of the grandchild partitions. The respective area may be based on the coordinates and/or boundaries of each of the grandchild partitions.

The partitioning application may generate nodes, associated with a location-based logic tree, that correspond to the sub-divided partitions. For example, the partitioning application may, in a manner similar to that described above (e.g., with respect to FIG. 4B), generate a different node (e.g., a grandchild node), associated with a location-based logic tree, for each of the grandchild partitions. The grandchild nodes may be logically interconnected to a child node from which the grandchild nodes were sub-divided. The partitioning application may continue to sub-divide partitions (e.g., into great grandchild partitions, etc.) when a quantity of objects, associated with a partition is greater than the threshold. Alternatively, or additionally, the partitioning application may generate nodes, associated with the location-based logic tree, that correspond with the sub-divided partitions.

As shown in FIG. 6, if the quantity of objects is less than a threshold (block 635-NO), then process 600 may include associating a cluster with a node that corresponds to the logic tree (block 650). For example, the partitioning application may determine that the quantity of objects associated with a partition (e.g., a child partition, a grandchild partition, etc.) is less than the threshold. Based on the determination, the partitioning application may identify the quantity of objects, associated with the partition, as a cluster that is associated with the node to which the partition corresponds. The partitioning application may determine that other partitions are associated with quantities of objects that are less than the threshold and may identify clusters, associated with the quantities of objects, that are associated with nodes to which the other partitions correspond.

In another example implementation, the partitioning application may determine that a quantity of objects associated with another partition is not less than the threshold and may identify the quantity of objects, associated with the other partition, as another cluster that is associated with another node to which the other partition corresponds. In this example, the partitioning application may determine that an area and/or one or more boundaries associated with the other partition is less than a size threshold (e.g., associated with a minimum partition size). Based on a determination that the area and/or one or more boundaries of the other partition is less than of the size threshold, the partitioning application may not further sub-divide the other partition and may process the other partition in a manner similar to that of a partition associated with a quantity of objects that are less than the threshold.

As also shown in FIG. 6, process 600 may include storing information associated with a logic-tree in a location-based data structure (block 655). For example, the partitioning application may store information associated with a particular node (e.g., a node identifier) of the logic tree in a location-based data structure (e.g., data structure 500 of FIG. 5). The partitioning application may store information associate with a geographic area that corresponds to the particular node in the data structure. The information associated with the geographic area may include coordinates and/or boundaries associated with the geographic area that correspond to a partition with which the particular node is associated.

If the particular node is associated with lower level nodes (e.g., nodes associated with partitions that were sub-divided from a partition that corresponds to the particular node) then the partitioning application may store information associated with the lower level nodes in the data structure. If, however, the node is not associated with lower level nodes, the partitioning application may store, in the data structure, contents of a cluster associated with the particular node and/or information associated with the cluster (e.g., a cluster identifier) associated with the particular node. The contents of the cluster may include location-based information corresponding to the objects associated with the cluster. The partitioning application may store information associated with each node of the logic tree in the data structure.

Figure 7:
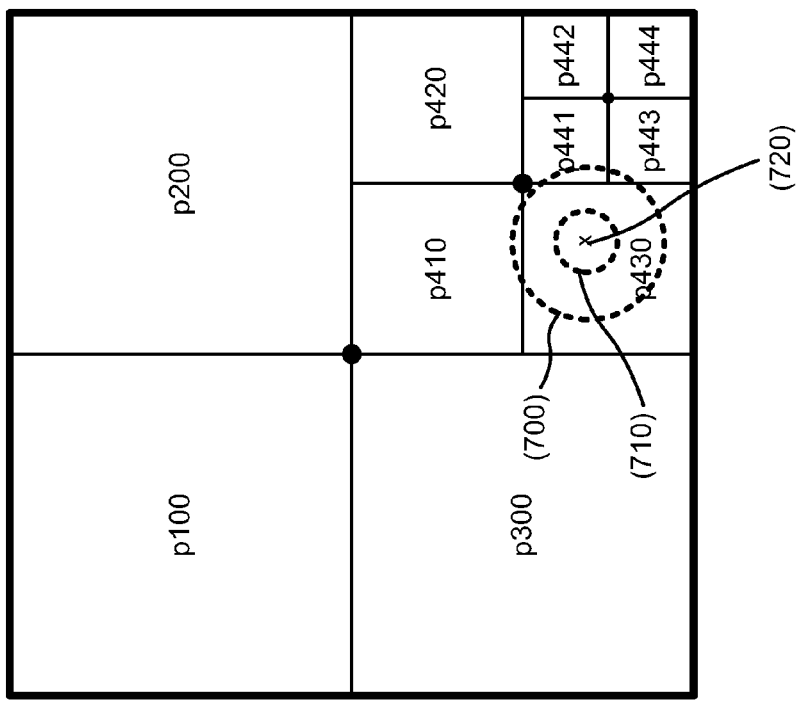
FIG. 7 is a diagram illustrating of an example search area used to perform a location-based search according to an implementation described herein.

FIG. 7 is a diagram illustrating of an example search area used to perform a location-based search according to an implementation described herein. FIG. 7 may include partition structure 400 of FIG. 4A and may include search area 700 (e.g., shown as a dashed circle) and a refined search area 710 (e.g., shown as a dashed circle with a radius that is less than a radius corresponding to the circle associated with search area 700). Search area 700 may correspond to a geographical area associated with a location of user device 110 (e.g., location 720, shown as an "x") that is used when performing a search for user device 110. For example, a user of user device 110 may desire to perform a search (e.g., to obtain a recommendation for a restaurant, a product or service, etc.) and may cause user device 110 to send a search query to network 160. Proxy server 120 may receive the search query and may obtain location information associated with user device 110 (e.g., location 720, shown as an "x") within partition p430. Proxy server 120 may send the search query and/or the location information to application server 130 to be processed.

Application server 130 may receive the search query and/or the location associated with user device 110 may use the location information and/or search area 700 to perform a location-based search. For example, the partitioning application may determine that a search area, centered on a location of user device 110, intersects particular partitions (e.g., associated with partition identifiers p410, p430, p441, and p443) within the partition structure. In another example, another search area may be used to perform the search (e.g., refined search area 710). In one example, refined search area 710 may be set by a user of user device. In another example, refined search area 710 may be used to filter and/or prioritize search results that are within a particular distance of user device 110 (e.g., within a distance that corresponds to a radius of refined search area 710). In yet another example, refined search area 710 may be used to perform the search and may be expanded (e.g., to search area 700) if the results of the search based on refined search area 710 are not adequate.

The partitioning application may use information associated with partitions (e.g., partition identifiers) intersected by a search area (e.g., search area 700 and/or 710) to identify which nodes, of logic tree 450 of FIG. 4B, a location-based search is to be performed based. In one example, the partitioning application may select nodes within logic tree 450 (e.g., nodes p400, p410, p430, p440, p441, and p443) that correspond to the intersected partitions within partition structure 400 of FIG. 4A. The partitioning application may use the selected nodes to perform a location-based search associated with user device 110.

Figure 8:
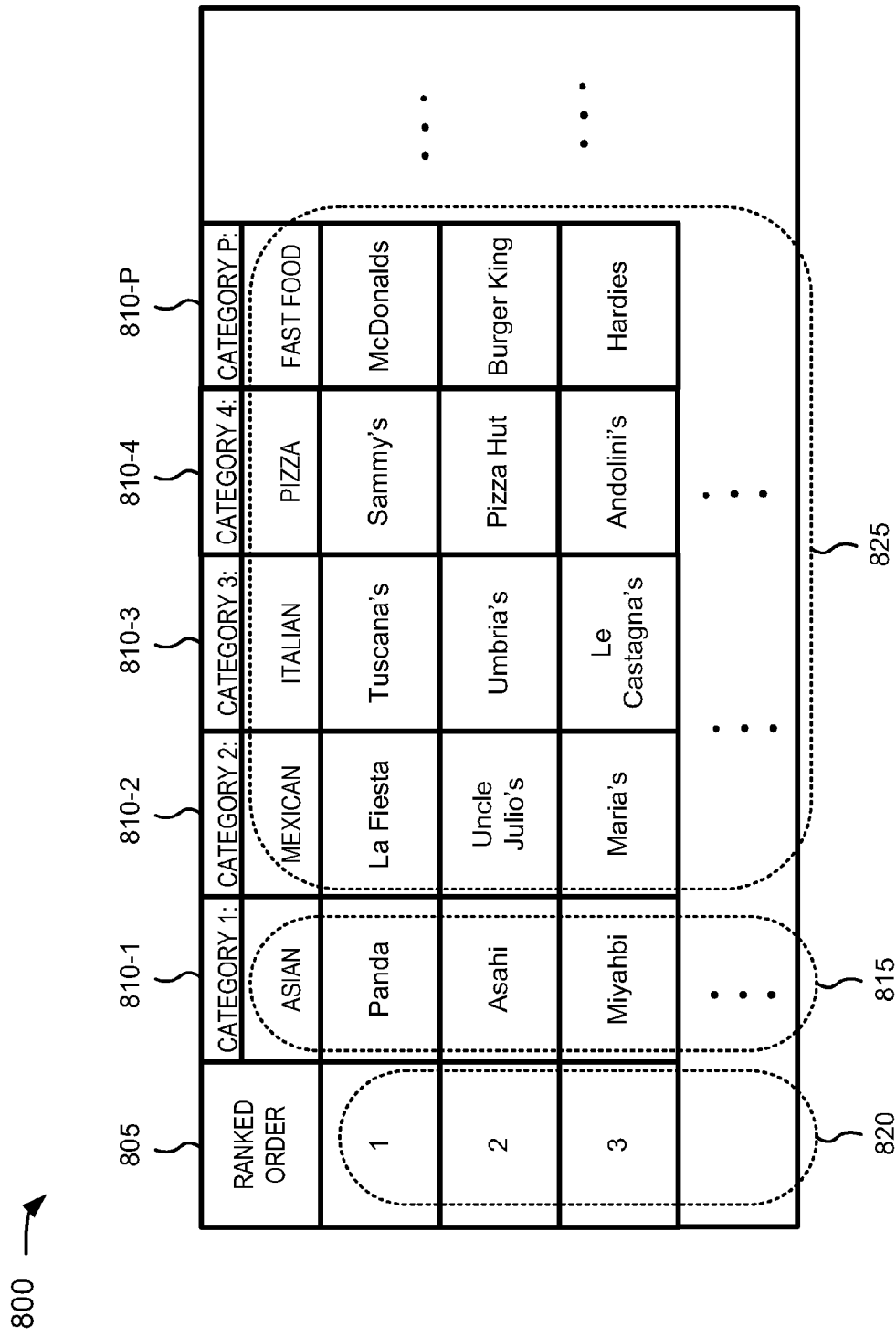
FIG. 8 is a diagram illustrating example recommendations as a result of a location-based search according to an implementation described herein.

FIG. 8 is a diagram illustrating example recommendations 800 as a result of a location-based search according to an implementation described herein. As illustrated in FIG. 8, recommendations 800 may include a collection of fields such as a ranked order field 805 and a group of subject matter category fields 810-1, . . . , 810-P (where P≥1) (hereinafter referred to collectively as "category fields 810 and individually as a "category field 810"). Although FIG. 8 shows example fields of recommendations 800, in other implementations, recommendations 800 may include fewer fields, different fields, additional fields, or differently arranged fields than depicted in FIG. 8. Additionally, or alternatively, one or more fields of recommendations field 800 may include information described as being included in one or more other fields of recommendations 800.

Ranked order field 805 may include a ranking value associated with an order of popularity associated with results obtained from a location-based search. For example, the partitioning application may assign a particular ranking value to results of a search (e.g., performed as a result of a search query received from user device 110) based on a measure of popularity of the results. The measure of popularity may be based on a quantity of searches that generate a particular result, a quantity users (e.g., of user devices 110) that purchased a good or service, etc. Category field 810 may include information associated subject matter categories (e.g., category 1, . . . , category P) corresponding to results of the location-based search and/or location-based recommendations associated with the results of the location-based search.

For example, the partitioning application may perform a location-based search, associated with user device 110, based on a search query for particular subject matter (e.g., to identify a list of Asian restaurants). The partitioning application may, in a manner similar to that described above (e.g., with respect to FIG. 7), identify a node (e.g., within logic tree 450 of FIG. 4B) to be used to perform a search based on a location associated with user device 110 and/or a search area (e.g., search areas 700 and/or 710 of FIG. 7). For example, the partitioning application may use the identified node to determine from which location database 140 and/or location-based data structure (e.g., data structure 500 of FIG. 5) to perform the search.

The partitioning application may, based on the search query, identify the particular subject matter from the cluster (e.g., that contains location-based information) associated with the identified node. For example, the partitioning application may identify a list of Asian restaurants (e.g., Panda, Asahi, Miyahbi, etc.) (e.g., as shown by ellipse 815). Additionally, or alternatively, the partitioning application may retrieve information, associated with a measure of popularity, corresponding to the results of the search. For example, the partitioning application may retrieve, from the cluster, a quantity of searches performed by other user devices 110 associated with the particular subject matter of the search and may rank the results of the search based on a relative quantity of searches associated with each item within the search result.

Additionally, or alternatively, the partitioning application may rank the search results based on third party reviews (e.g., from critics, news sources, etc.), ratings obtained from users of user devices 110, etc. The partitioning application may generate a location-based recommendation, associated with the search results (e.g., by ranking Panda as first, Asahi as second, Miyahbi as third, etc.) based on the ranking associated with the search results (e.g., as shown by ellipse 820).

The partitioning application may generate other location-based recommendations. For example, the partitioning application may determine, from the cluster associated with the identified node, information associated with searches performed by other user devices 110 that performed a search based on the particular subject matter. The partitioning application may, for example, determine that the other user devices 110 associated with searches for the particular subject matter (e.g., Asian restaurants), also performed searches for other subject matter (e.g., other restaurant categories). The partitioning application may retrieve search results associated with the other subject matter (e.g., restaurants information associated with Mexican, Italian, pizza, fast food, etc. cuisine) (e.g., as shown by ellipse 825) and may rank the search results associated with the other subject matter. The partitioning application may generate one or more other location-based recommendations, associated with the search results (e.g., by ranking the restaurant information associated with each restaurant category, etc.) based on the ranking associated with the search results (e.g., as shown by ellipse 820).

Figure 9:
FIG. 9 is a flow chart of an example process for performing a location-based search to obtain location-based recommendations according to an implementation described herein.

FIG. 9 is a flow chart of an example process for performing a location-based search to obtain location-based recommendations according to an implementation described herein. In one implementation, process 900 may be performed by application server 130. In other implementations, some or all of process 900 may be performed by another device or a group of devices separate from or including application server 130.

As shown in FIG. 9, process 900 may include receiving a request for a location-based recommendation (block 905) and identifying from which location-based data structure to retrieve location-based information in response to the request (block 910). For example, a user of user device 110 may desire to perform a search to obtain a recommendation with respect to a product and/or service and/or some other recommendation. The user may generate a search query (e.g., by entering, into user device 110, key words or other information associated with particular subject matter to be searched) and may cause user device 110 to send the search query to network 160. Proxy server 120 may receive the search query and may obtain location information associated with user device 110 (e.g., location 720 of FIG. 7). Proxy server 120 may send the search query and/or the location information to application server 130 to be processed.

Application server 130 may receive the search query and/or the location information and may use a search area (e.g., search area 700 of FIG. 7) associated with the location information to perform a location-based search in response to the request. For example, the partitioning application may determine that all or a portion of particular partitions, within a location-based partition structure (e.g., partition structure 400 of FIG. 4A), are intersected by the search area. In another example, the partitioning application may refine and/or narrow the search by identifying which of the particular partitions are intersected by a refined search area (e.g., refined search area 710 of FIG. 7) associated with an area and/or perimeter that is less than that associated with the search area). The partitioning application may, for example, use the refined search area to recommend results that are closer to user device 110 (e.g., associated with locations within the refined search area), than results that are within the search area, but near the perimeter of the search area (e.g., outside refined search area 710, but within search area 700).

In yet another example, the partitioning application may expand the search area (e.g., from refined search area 710 to search area 700 and/or from search area 700 to a search area associated with an area and/or perimeter that is greater than search area 700) if a quantity of search results associated with a particular search area is less than a threshold.

The partitioning application may select one or more nodes, within a location-based logic tree (e.g., logic tree 450 of FIG. 4B), that correspond to the particular partitions intersected by the search area and/or the refined search area. The partitioning application may use the selected nodes to identify from which location-based data structure (e.g., data structure 500 of FIG. 5) and/or from which location database 140, location-based information, associated with one or more of the selected nodes, is to be retrieved.

As also shown in FIG. 9, process 900 may include retrieving location-based information based on a search associated with the request (block 915). For example, the partitioning application may perform a location-based search, of the identified location-based data structure that corresponds to one or more of the selected nodes, in response to the search query received from user device 110.

The partitioning application may, based on the search query, identify particular subject matter from a cluster (e.g., that includes location-based information) associated with one or more selected nodes. Additionally, or alternatively, the partitioning application may retrieve information associated with a measure of popularity associated with results of the search. For example, the partitioning application may retrieve, from the cluster, a quantity of searches, performed by other user devices 110, associated with the particular subject matter. In another example, the partitioning application may retrieve, from the cluster, reviews and/or ratings (e.g., received from other user devices 110, news sources, etc.) associated with search results. For example, the reviews and/or ratings may be associated with prior feedback (e.g., with respect to a level of satisfaction and/or other sentiment received from users of user devices 110) regarding the particular subject matter (e.g., a product, service, business, movie, etc.) identified in the search results.

As further shown in FIG. 9, process 900 may include processing the location-based information and generating a location-based recommendation based on the processed information (block 920). For example, the partitioning application may rank the results of the search based on a relative quantity of searches associated with each of the search results. Additionally, or alternatively, the partitioning application may rank the search results based information associated with the reviews or ratings retrieved from the cluster. The partitioning application may generate a location-based recommendation, associated with the search results based on the ranking associated with the search results.

In another example, the partitioning application may retrieve, from the cluster, information associated with searches, associated with the particular subject matter, performed by other user devices 110. The partitioning application may, for example, determine that the other user devices 110 also performed searches for other subject matter. The partitioning application may retrieve search results associated with the other subject matter (e.g., another product, service, business, movie, etc.) and may rank the search results associated with the other subject matter. The partitioning application may generate one or more other location-based recommendations, associated with the search results based on the ranking associated with the search results.

In another example implementation, the partitioning application may generate location-based recommendations based on context information associated with user devices 110. For example, the partitioning application may retrieve information, associated with other user devices 110 that purchased a product and/or service within one or more partitions intersected by the search area and/or refined search area. The information may be retrieved from one or more clusters associated with the one or more partitions. The partitioning application may use the retrieved information to identify other products and/or services, and/or to rank the identified products or services in order to generate a location-based recommendation for user device 110. For example, the partitioning application may recommend another product and/or service based on a determination that the other user devices 110, that purchased the product and/or service, also purchase the other product and/or service. The partitioning application may identify more than one other products and/or services and may rank the other products and services by determining the relative quantity of other products and/or services that were purchased by the other user devices 110.

As is further shown in FIG. 9, process 900 may include sending the location-based recommendation in response to the request (block 925) and updating the location-based data structure based on the request (block 930). The partitioning application may send the results of a subject matter search, to user device 110, in response to the search query. Additionally, or alternatively, the partitioning application may send location-based recommendations, to user devices 110, in response to the search query based on the results of the subject matter search. The partitioning application may update the location-based data structure, from which the search was performed. For example, the partitioning application may store information associated with the search query received from user device 110. The partitioning application may store information associated with which results and/or location-based recommendations were used by user device 110. The partitioning application may store information associated with which product and/or service was purchased by the user of user device 110.

The foregoing description of implementations provides illustration and description, but is not intended to be exhaustive or to limit the invention to the precise form disclosed. Modifications and variations are possible in light of the above teachings or may be acquired from practice of the invention.

While series of blocks have been described with regard to FIGS. 6 and 9 the order of the blocks may be modified in other implementations. Further, non-dependent blocks may be performed in parallel.

Further, certain portions, described above, may be implemented as a component or logic that performs one or more functions. A component or logic, as used herein, may include hardware, such as a processor, an ASIC, or a FPGA, or a combination of hardware and software (e.g., a processor executing software).

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
receiving, by a server device and from a user device, a request to perform a search associated with first subject matter;
receiving location information associated with the user device, wherein the location information includes a search area within which the user device is located;
identifying, by the server device, a data structure, of a plurality of data structures, from which to perform the search, based on the search area, where the data structure stores information associated with at least one geographic area that is intersected by the search area;
retrieving, by the server device and from the identified data structure, a plurality of search results associated with subject matter identified in the request;
identifying, by the server device and based on information obtained from the data structure, one or more other user devices that performed searches based on the subject matter;
retrieving, by the server device and from the data structure, a plurality of other search results as a result of prior searches, associated with other subject matter than the first subject matter, that were performed by the identified one or more other user devices; and
sending, by the server device and to the user device, the plurality of search results and the plurality of other search results, where the plurality of other search results are provided as recommendations to a user of the user device.

2. The method of claim 1, further comprising:
determining a relative measure of popularity, associated with each of the plurality of search results, based on a quantity of prior searches, performed by at least one of the identified one or more other user devices, that were associated with the each of the plurality of search results; and
ranking all or a portion of the plurality of search results based on the relative measure of popularity associated with the each of the plurality of search results.

3. The method of claim 1, further comprising:
determining a relative measure of popularity, associated with each of the plurality of other search results, based on a quantity of the prior searches, performed by the one or more other user devices, that were associated with the each of the plurality of other search results; and
ranking all or a portion of the plurality of other search results based on the relative measure of popularity associated with the each of the plurality of other search results.

4. The method of claim 1, where identifying the data structure from which to perform the search further includes:
identifying one or more partitions, of a plurality of partitions, that are intersected by the search area, where each of the plurality of partitions are associated with a respective, different geographical area; and
selecting one or more nodes, of a plurality of nodes associated with a logic tree, that correspond to the one or more partitions, where the logic tree is associated with the plurality of partitions, and where the one or more nodes correspond to the data structure.

5. The method of claim 1, further comprising:
increasing a perimeter associated with the search area to broaden the search, where broadening the search increases a quantity of search results obtained as a result of the increased perimeter.

6. The method of claim 1, further comprising:
decreasing a perimeter associated with the search area to narrow the search, where narrowing the search decreases a distance between locations associated with the plurality of search results, obtained as a result of the decreased perimeter, and the location associated with the user device.

7. The method of claim 1, where retrieving the plurality of other search results, based on prior searches, further includes:
identifying a product or service purchased by all or a portion of the one or more other user devices; and
sending, to the user device, a recommendation that includes information associated with the product or service purchased by the all or the portion of the one or more other user devices.

8. The method of claim 1, further comprising:
receiving a request to generate the plurality of data structures, where the plurality of data structures are associated with a geographic area;
retrieving, from another server device, information associated with a plurality of subject matter to be stored in the plurality of data structures, where the information, associated with the plurality of subject matter, corresponds to a plurality of locations within the geographic area;
sub-dividing the geographic area into a plurality of partitions, where each of the plurality of partitions corresponds to a respective different portion of the geographic area; and
storing a respective portion of the information associated with the plurality of subject matter, that corresponds to one or more of the plurality of partitions, in the data structure.

9. The method of claim 8, further comprising:
associating the information associated with the plurality of subject matter with a plurality of objects, where each object is associated with a particular unit of information that corresponds to a location within the geographic area;
creating a partition that is associated with the geographic area, where the partition includes a perimeter that surrounds the geographic area with which is the plurality of objects are associated;
determining that a quantity associated with the plurality of objects associated with the partition is greater than a threshold; and
sub-dividing the partition into other partitions, of the plurality of partitions, based on the determination that the quantity of objects is greater than the threshold.

10. The method of claim 1, further comprising:
storing, in the data structure, information associated with the search that includes at least one of information associated with the subject matter, information associated with the user device, or information associated with the plurality of search results.

11. A server device comprising:
a non-transitory memory to store a data structure that includes information associated with a plurality of partitions, where each of the plurality of partitions corresponds to a respective different portion of a geographical area; and
a processor to:
receive, from a user device, a request to perform a search associated with first subject matter,
receive location information associated with the user device, wherein the location information includes a search area within which the user device is located;

identify one or more partitions, of the plurality of partitions, associated with one or more portions of the geographical area that are intersected by the search area that corresponds to a location, associated with the user device, obtained from the request, search a portion of the information that is associated with the identified one or more partitions to obtain search results associated with subject matter obtained from the request, identify, based on the portion of the information, other search results obtained by one or more other user devices, associated with other subject matter than the first subject matter, which performed searches associated with the subject matter, and send, to the user device, the search results and recommendations associated with the other search results, where the recommendations are based on a measure of popularity of all or a portion of the other search results.

12. The server device of claim 11, where the processor is further to:
determine the relative measure of popularity associated with each of the other search results based on a quantity of searches associated with the each of the other search results, and
recommend the all or the portion of the other search results associated with a relative measure of popularity that is greater than a threshold.

13. The server device of claim 11, where the processor is further to:
determine another relative measure of popularity associated with each of the search results based on at least one of a rating received from other user devices, a review obtained from another server device, or a quantity of prior searches associated with the each of the search results.

14. The server device of claim 11, where, when identifying the one or more partitions, the processor is further to:
select one or more nodes, of a plurality of nodes associated with a logic tree, that corresponds to the one or more partitions, where the logic tree is associated with the plurality of partitions, and
identify the portion of the plurality of information that corresponds to information associated with the selected one or more nodes.

15. The server device of claim 11, where the search area is automatically determined based on hardware or software associated with the server device or is set by a user of the user device.

16. The server device of claim 11, where, when identifying the other search results obtained by one or more other user devices, the processor is further to:
identify a product or service purchased by at least one of the other user devices, and
send information associated with the product or service to the user device as a recommendation associated with the other search results.

17. The server device of claim 11, where the processor is further to:
receive a request to generate the data structure associated with a geographic area,
retrieve, from another server device, the plurality of information to be stored in the data structure, where the plurality of information includes information associated with a plurality of locations within the geographic area, and
sub-divide the geographic area into the plurality of partitions based on a threshold associated with a maximum quantity of information permitted to be associated with each of the plurality of partitions.

18. The server device of claim 17, where, when sub-dividing the geographic area into the plurality of partitions, the processor is to:
determine that a partition, of the plurality of partitions, is not to be sub-divided based on a determination that:
a quantity of information associated with the partition is less than the threshold, or an area or perimeter, associated with the partition, is less than another threshold.

19. A method comprising:
receiving, by a server device, an instruction to generate a plurality of data structures that enables a user device to perform a location-based search;
retrieving, by the server device and from another server device, a plurality of information to be stored in the plurality of data structures, where the plurality of information includes information associated with a plurality of locations within a geographic area;
sub-dividing the geographic area into a plurality of partitions based on a threshold associated with a maximum quantity of information permitted to be associated with each of the plurality of partitions, where each of the plurality of partitions is associated with a respective portion of the geographical area;
storing, by the server device and in a data structure of the plurality of data structures, a portion of the plurality of information associated with one or more of the plurality of locations, where the one or more of the plurality of locations are within a portion of the geographical area associated with a partition, of the plurality of partitions;
receiving, by the server device and from the user device, a request to perform the location-based search based on particular subject matter;
determining, by the server device and in response to the request, that a location associated with the user device corresponds to the portion of the geographical area associated with the partition;
retrieving, by the server device and from the data structure, search results associated with the subject matter based on the determination that the location associated with the user device corresponds to the portion of the geographical area associated with the partition;
retrieving, by the server device and from the data structure, other search results based on a search, associated with other subject matter than the particular subject matter, that was performed by another user device; and
sending, by the server device and to the user device, all or a portion of the other search results.

20. The method of claim 19, where retrieving the plurality of information to be stored in the plurality of data structures further includes:
associating the plurality of information with a plurality of objects, where each object is associated with a particular unit of information that corresponds to a location within the geographic area; and
creating a partition that is associated with the geographic area, where the partition includes a perimeter that surrounds the geographic area and within which is the plurality of objects.

21. The method of claim 20, where sub-dividing the geographic area into the plurality of partitions further includes:
determining that a quantity of the plurality of objects is greater than the threshold; and generating information associated with other partitions, based on the determination that the quantity of objects is greater than the threshold, where the information associated with the other partitions include boundaries or coordinates associated with the other partitions.

22. The method of claim 20, where the plurality of objects include a plurality of points and a plurality of links,
- where each of the plurality of points corresponds to a respective different unit of information and information associated with a respective location within the geographical area, and
- where each of the plurality of links logically interconnects at least two points, of the plurality of points.

23. The method of claim 19, where determining that the location associated with the user device corresponds to the portion of the geographical area associated with the partition further includes:
- identifying a node, of a plurality of nodes associated with a logic tree, that corresponds to the partition, where the logic tree includes:
  - a parent node associated with a parent partition that corresponds to the geographical area,
  - one or more child nodes that are logically interconnected to the parent node that correspond to at least two child partitions created by sub-dividing the parent partition, and
  - two or more other nodes that are logically interconnected to all or a portion of the one or more child nodes that correspond to other partitions created by sub-dividing all or a portion of the at least two child partitions
- identifying the data structure, of the plurality of data structures, based on the identified node, where the identified node corresponds to the partition.

24. The method of claim 23, further comprising:
retrieving, from the data structure, information associated with the identified node that includes information associated with at least two particular nodes, where the at least two particular nodes correspond to at least two particular partitions that were creating by subdividing the partition; and
retrieving, from the data structure, information associated with one particular partition of the at least two particular nodes, where the information associated with the one particular partition includes all or a portion of the search results.

* * * * *